United States Patent [19]

Matsushita

[11] Patent Number: 5,077,718
[45] Date of Patent: Dec. 31, 1991

[54] OPTICAL INFORMATION PROCESSING METHOD AND APPARATUS IN WHICH MALFUNCTIONING DURING TRACKING SERVO PULL-IN IS PREVENTED

[75] Inventor: Machiko Matsushita, Yokohama, Japan

[73] Assignee: Canon Kabushiki Kaisha, Tokyo, Japan

[21] Appl. No.: 419,749

[22] Filed: Oct. 11, 1989

[30] Foreign Application Priority Data

Oct. 12, 1988 [JP] Japan ................................ 63-255000

[51] Int. Cl.$^5$ ............................................. G11B 7/00
[52] U.S. Cl. .............................. 369/44.32; 369/44.35
[58] Field of Search ................. 369/32, 53, 54, 58, 369/44.32, 32, 44.29, 44.35; 250/201.5

[56] References Cited

U.S. PATENT DOCUMENTS

| | | | |
|---|---|---|---|
| 4,730,290 | 3/1988 | Takasago et al. | 369/32 |
| 4,764,860 | 8/1988 | Takao | 369/54 X |
| 4,912,697 | 3/1990 | Enari et al. | 369/116 |
| 4,982,393 | 1/1991 | Matsushita et al. | 369/44.32 |
| 5,010,534 | 4/1991 | Enari et al. | 369/32 |

FOREIGN PATENT DOCUMENTS

244665 11/1987 European Pat. Off. .
258043  3/1988 European Pat. Off. .
261918  3/1988 European Pat. Off. .

*Primary Examiner*—Robert L. Richardson
*Attorney, Agent, or Firm*—Fitzpatrick, Cella, Harper & Scinto

[57] ABSTRACT

An optical information processing apparatus includes a device for scanning tracks formed on an optical recording medium by a light beam, a device for moving the applied position of the light beam in a direction across the tracks, a device for detecting a tracking error signal indicative of the deviation between the applied position of the light beam and the tracks, a tracking servo device for feeding the tracking error signal back to the moving means, a switching device for selectively rendering the tracking servo device operative or inoperative, and a control device for measuring the time for which the tracking error signal exceeds a predetermined level, and switching the tracking servo device from its inoperative state to its operative state by the switching device after the aforementioned time exceeds a predetermined time.

11 Claims, 12 Drawing Sheets

OPTICAL INFORMATION PROCESSING METHOD AND APPARATUS IN WHICH MALFUNCTIONING DURING TRACKING SERVO PULL-IN IS PREVENTED

BACKGROUND OF THE INVENTION

1. Field of the Invention

This invention relates to an optical information processing method and apparatus for scanning an optical recording medium provided with tracks by a light beam and for effecting recording and/or reproduction of information while effecting tracking servo of the light beam.

2. Related Background Art

Various examples such as a disc-like form, a card-like form and a tape-like form are known as the forms of information recording media for recording information thereon and for reading out the information recorded thereon. Also, recently, attention has been paid to a method of applying a light beam condensed in the form of a spot to such media to thereby accomplish recording and reading-out of information, because of its capability of enhancing the recording density.

The manner of such recording will hereinafter be described by taking as an example a case wherein use is made of a card-like optical recording medium (hereinafter referred to as an optical card).

Figure 1:
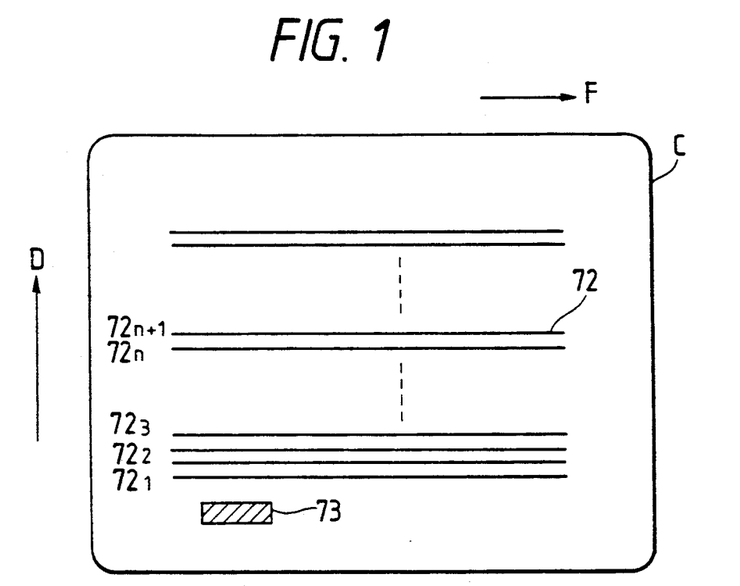
FIGS. 1 and 2 are a schematic plan view and a fragmentary enlarged view, respectively, of an optical card.
Figure 2:
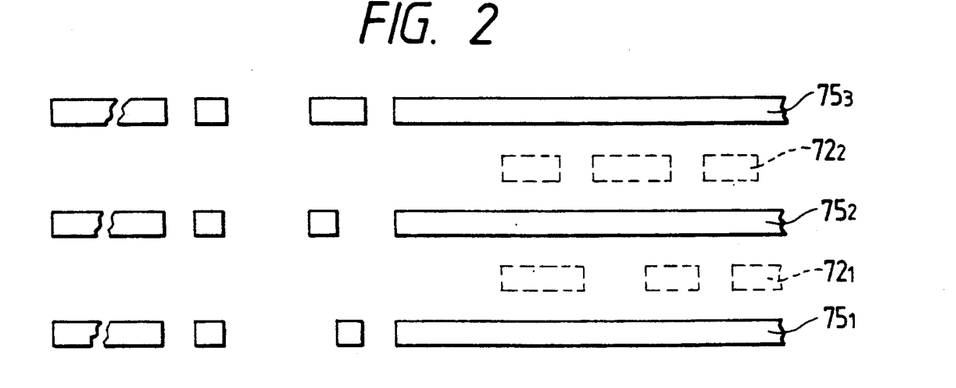

FIG. 1 of the accompanying drawings is a schematic plan view of the optical card, and FIG. 2 of the accompanying drawings is a fragmentary enlarged view thereof.

In FIG. 1, the letter C designates the optical card, the reference numeral 72 denotes information tracks, and the reference numeral 73 indicates the home position. Information is recorded as optically detectable record pit rows (information tracks) on the optical card C by causing a light beam modulated in accordance with recording information and reduced down into a minute spot to scan the card C. At this time, to record or reproduce information accurately without causing any trouble such as crossing of the information tracks 72, it is necessary to control the applied position of the light beam in a direction perpendicular to the scanning direction (auto tracking, hereinafter referred to as AT). Also, to apply the minute spot stably in spite of any bending or mechanical error of the optical card, it is necessary to control the applied position of the light beam in a direction perpendicular to the optical card (auto focusing, hereinafter referred to as AF). As shown in FIG. 2, tracking tracks 75 ($75_1$, $75_2$, ...) for effecting the aforementioned AT are provided between the information tracks 72 ($72_1$, $72_2$, ...) of the optical card C.

A method of recording information on the optical card will now be described.

In FIG. 1, the light beam is at first positioned at the home position 73. The light beam is then moved in the direction of arrow D to seek an information track $72_n$ to be recorded, and scans the information track $72_n$ in the direction of arrow F, thereby accomplishing recording or reproduction of information. Track numbers are recorded on the information tracks 72, and by reproducing this information, the information track currently being recorded can be determined. Also, recording of information is carried out in the fashion of a postscript, i.e., in the order of the information tracks $72_1$, $72_2$, ..., $72_n$.

Figure 3:
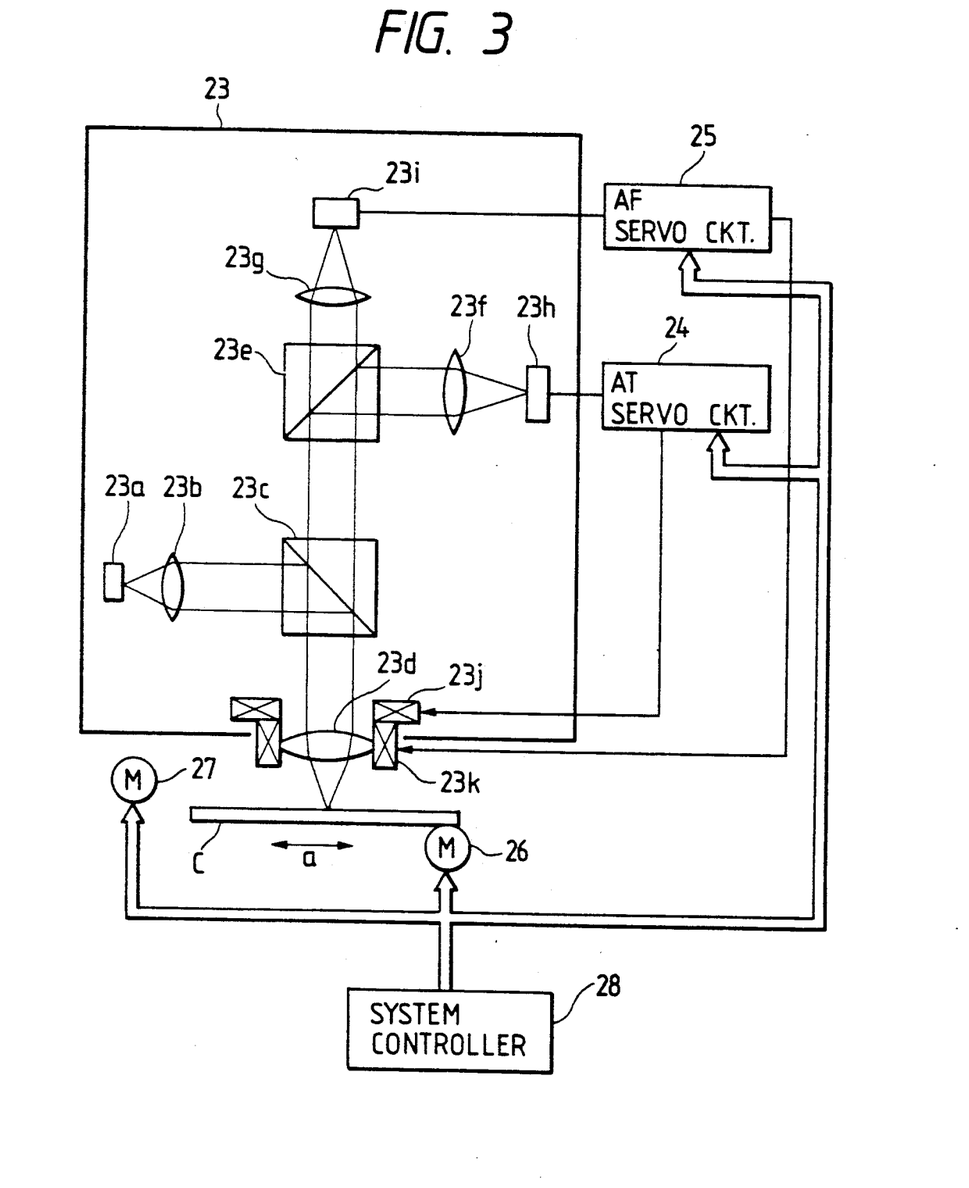
FIG. 3 is a schematic diagram showing an example of the construction of an optical card information recording-reproducing apparatus.

FIG. 3 of the accompanying drawings is a block diagram showing the construction of an information recording-reproducing apparatus for the optical card as described above.

In FIG. 3, a system controller 28 controls motors 26 and 27 and AT and AF servo circuits 24 and 25 to thereby control recording or reproduction of information on the optical card C.

The motor 26 reciprocally moves the optical card C in the direction of double-head arrow a, whereby a light beam is applied from an optical head 23 along the information tracks of the optical card C. The motor 27 is for moving the optical head 23 in a direction perpendicular to the information tracks on the optical card C.

The optical head 23 includes a light source 23a comprising a semiconductor laser, a collimator lens 23b for collimating the light beam from the light source 23a, a beam splitter 23c and an objective lens 23d, and applies a light beam for recording/reproduction onto the recording surface of the optical card C.

The optical head 23 also includes a beam splitter 23e, condensing lenses 23f and 23g, and photoelectric converters 23h and 23i. The light beam reflected on the recording surface of the optical card C is received by the photoelectric converters 23h and is 23i and converted into electrical signals thereby, and the electrical signals are supplied to the AT servo circuit 24 and the AF servo circuit 25, respectively.

The AT servo circuit 24 and the AF servo circuit 25 direct driving currents to the tracking actuator 23j and focusing actuator 23k of the optical head 23 to thereby move the objective lens 23d and to effect AT and AF control.

The basic construction of such an information recording-reproducing apparatus is disclosed, for example, in U.S. Pat. No. 4,912,697 and in U.S. Pat. No. 5,010,534.

Figure 4:
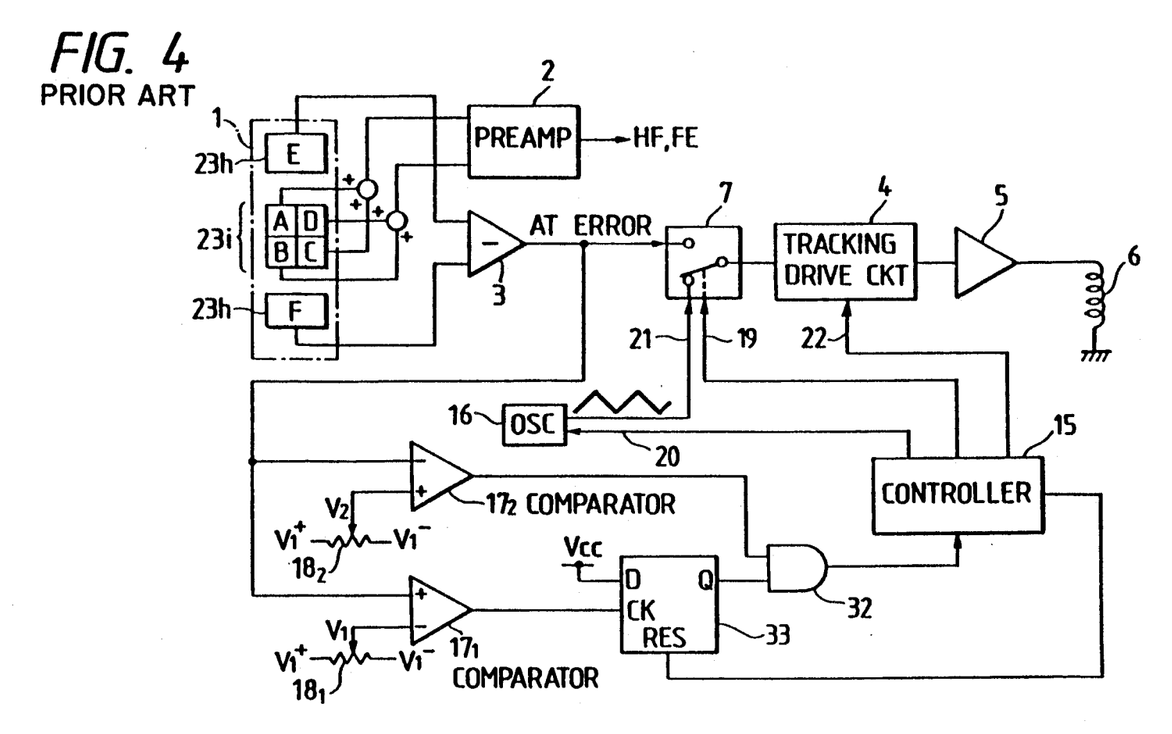
FIG. 4 is a block diagram showing an example of the construction of an AT servo circuit according to the prior art.

FIG. 4 of the accompanying drawings shows an example of the prior art relating to the circuits around the above-described AT servo circuit.

The reference numeral 1 designates a photo-detector for converting laser light subjected to reflection and modulation on a recording information carrier into electric current, the reference numeral 2 denotes a pre-amplifier for extracting an information signal HF and a focusing error signal FE by the output of the photodetector 1, the reference numeral 3 designates a tracking error amplifier for extracting a tracking error (AT error) signal from the output of the photodetector 1, the reference numeral 4 denotes a tracking drive circuit for converting the tracking error signal into a control signal for stably driving a tracking actuator 6, the reference numeral 5 designates an amplifier, the reference numeral 7 denotes a change-over switch for changing over the tracking error signal and the output signal 21 of an oscillator 16 by a control signal 19 from a servo controller 15, the reference numeral 17 designates a comparator, the reference numeral 32 denotes an AND gate, and the reference numeral 33 designates a D flip-flop circuit.

In the construction as described above, the laser light subjected to reflection and modulation on the information recording carrier includes the recording information and information regarding focusing error and tracking error, and this laser light is photoelectrically converted by the photodetector 1, and a recording information signal and a focusing error signal are extracted by the preamplifier 2.

On the other hand, the tracking error signal is extracted by the tracking amplifier 3. In the ordinary reproduction mode, the switch 7 is connected to the tracking servo amplifier 3 side. Accordingly, the tracking error signal is sent to the tracking drive circuit 4 and drives the tracking actuator 6, whereby AT is effected.

The following process has heretofore been utilized to cause a shift from the auto tracking-OFF state to the auto tracking-ON state as described above.

The controller 15 sends an oscillation permission signal 20 to the oscillator 16. At the same time, the controller 15 supplies a control signal 19 for connecting the change-over switch 7 to the output side of the oscillator 16. The oscillator 16 outputs a triangular wave to thereby reciprocally move the tracking actuator at a predetermined amplitude and a predetermined speed in a direction across the tracks through the tracking drive circuit 4. At that time, any change in the AT error signal is input to a comparator $17_1$, and whether the AT error signal has reached a value $V_1$ preset by a voltage varying device $18_1$ is monitored. If the AT error signal exceeds the value $V_1$, the comparator $17_1$ inputs a high level signal to the D flip-flop 33. Even after the AT error signal becomes below the value $V_1$, the D flip-flop 33 continues to output a high level signal to the AND gate 32. On the other hand, the AT error signal is input to a comparator $17_2$, and whether this signal is below a value $V_2$ preset by a voltage varying device $18_2$ is monitored. The comparator $17_2$ outputs a high level signal to the AND gate 32 during a period of time when the AT error signal is below the value $V_2$. That is, the output of the AND gate 32 does not assume a high level until the AT error signal first exceeds the value $V_1$ and then decreases below the value $V_2$. When this high level signal is input, the controller 15 sends a change-over signal to the switch 7 to thereby connect the tracking drive circuit 4 to the tracking amplifier 3 and to operate the tracking servo.

Figure 5:
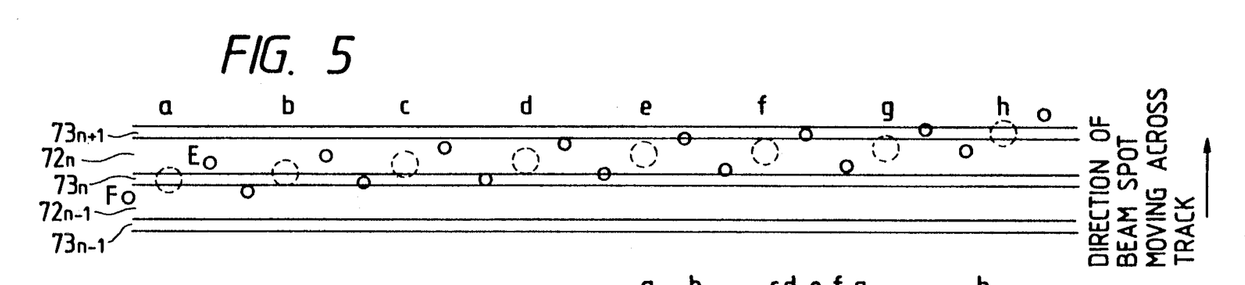
FIG. 5 is a schematic view showing the manner in which a light spot crosses tracks on an optical recording medium.
Figure 6:
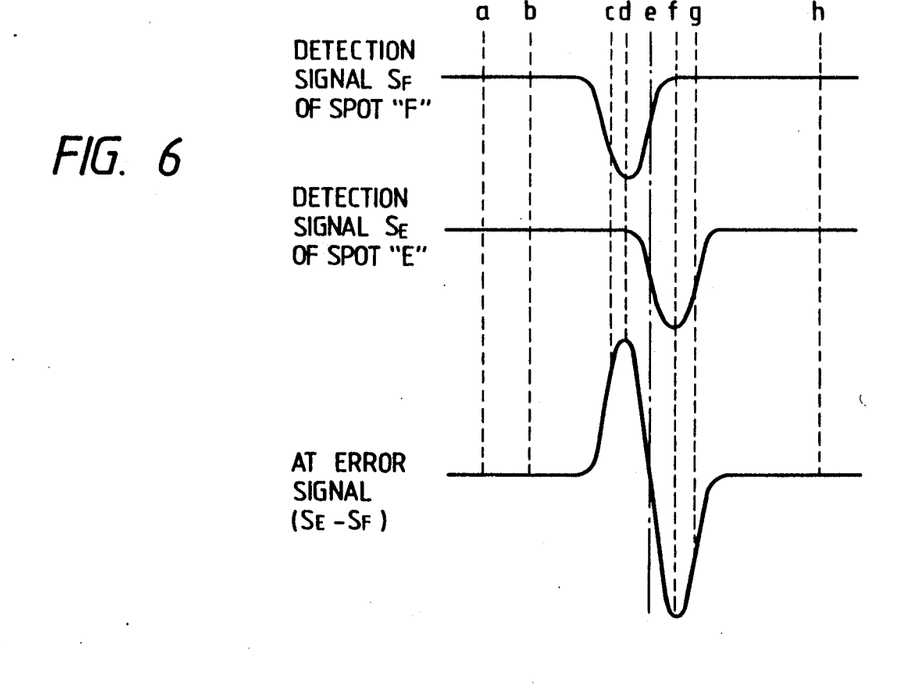
FIG. 6 is a waveform graph showing variations in the detection signals of the light spot and an AT error signal corresponding to FIG. 5.

FIGS. 5 and 6 of the accompanying drawings illustrate a light beam spot as it relatively crosses the tracks on the recording carrier in the aforedescribed auto tracking-OFF state. FIG. 5 schematically shows the relative positional relation of information tracks $72_{n-1}$ and $72_n$ and tracking tracks $73_{n-1}-73_{n+1}$ with this light beam spot, and in the figure, reference characters a-h show the manner in which that positional relation changes every moment. FIG. 6 is a signal waveform graph showing the detection signals of beam spots E and F corresponding to the states a-h and the AT error signal (E-F).

Here, the beam spots E and F are detected by the reflected lights thereof being received by a photoelectric conversion element 23h shown in FIG. 4.

Figure 7:
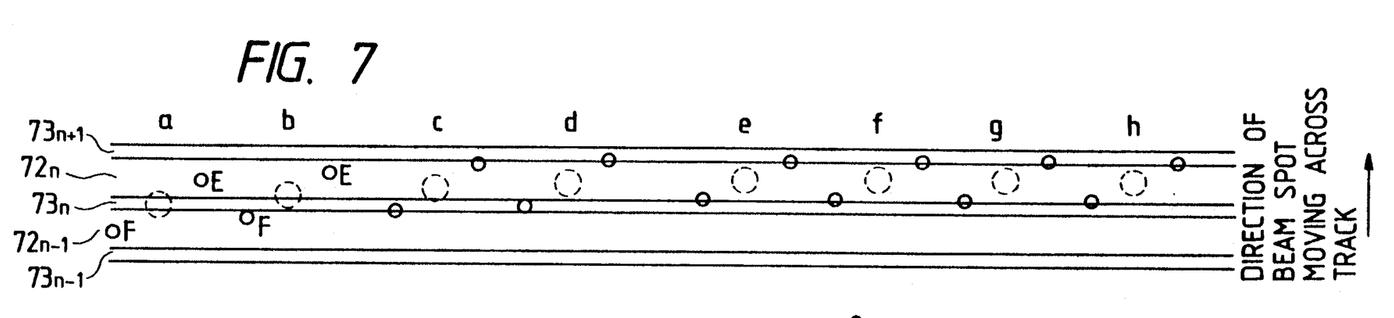
FIG. 7 is a schematic view showing the states of the tracks and the light spot when the pull-in of the tracking servo is effected by the use of the circuit shown in FIG. 4.
Figure 8:
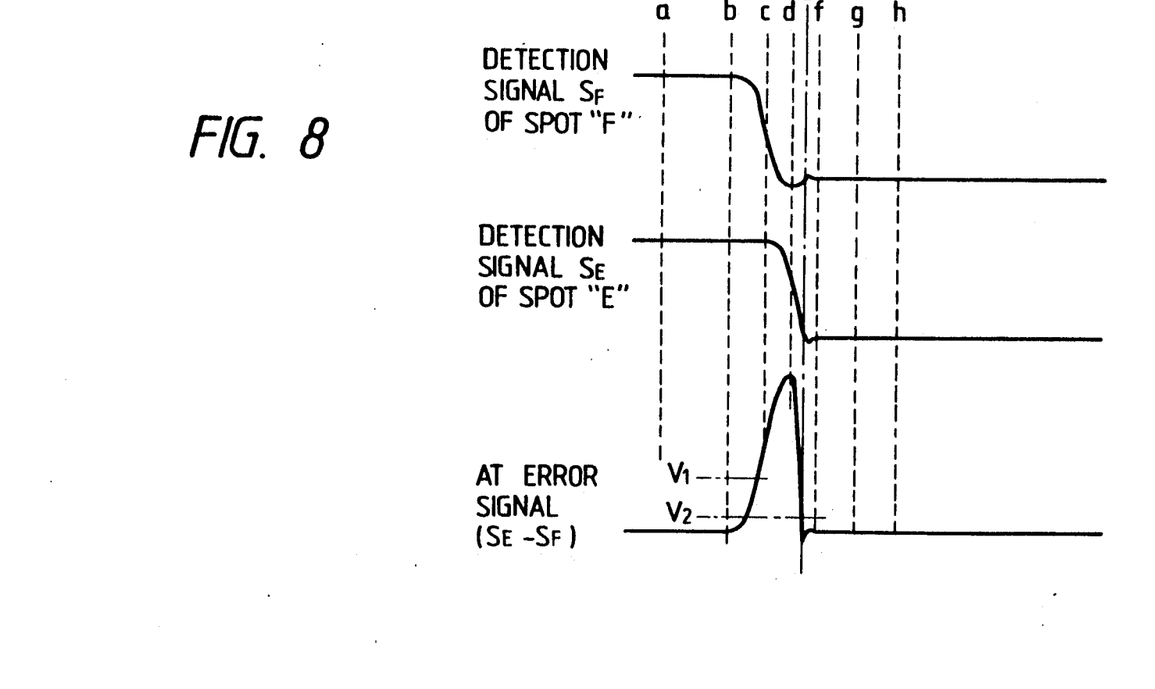
FIG. 8 is a waveform graph showing variations in the detection signals of the light spot and an AT error signal corresponding to FIG. 7.

Description will now be made of the process until a shift is made by the circuit shown in FIG. 4 from the auto tracking-OFF state to the ON state in which tracking servo has been applied. FIGS. 7 and 8 of the accompanying drawings show the circumstances during this process. In the example shown in FIG. 7, when the beam spot moves relatively upward in the plane of the drawing sheet, the detection signals of the beams E and F and the AT error signal exhibit the waveforms as shown in FIG. 8. Here, when the AT error signal becomes lower than a voltage $V_2$ in the vicinity of 0V after the AT error signal becomes greater than a predetermined voltage $V_1$, the servo loop is closed. Accordingly, from and this point and as shown in FIG. 7, the light spot traces the information track $72_n$. The predetermined voltage $V_1$ is determined by the contrast of the information tracks $72_n$, $72_{n-1}$ and the tracking tracks $73_{n-1}-73_{n+1}$.

Figures 9, 10:
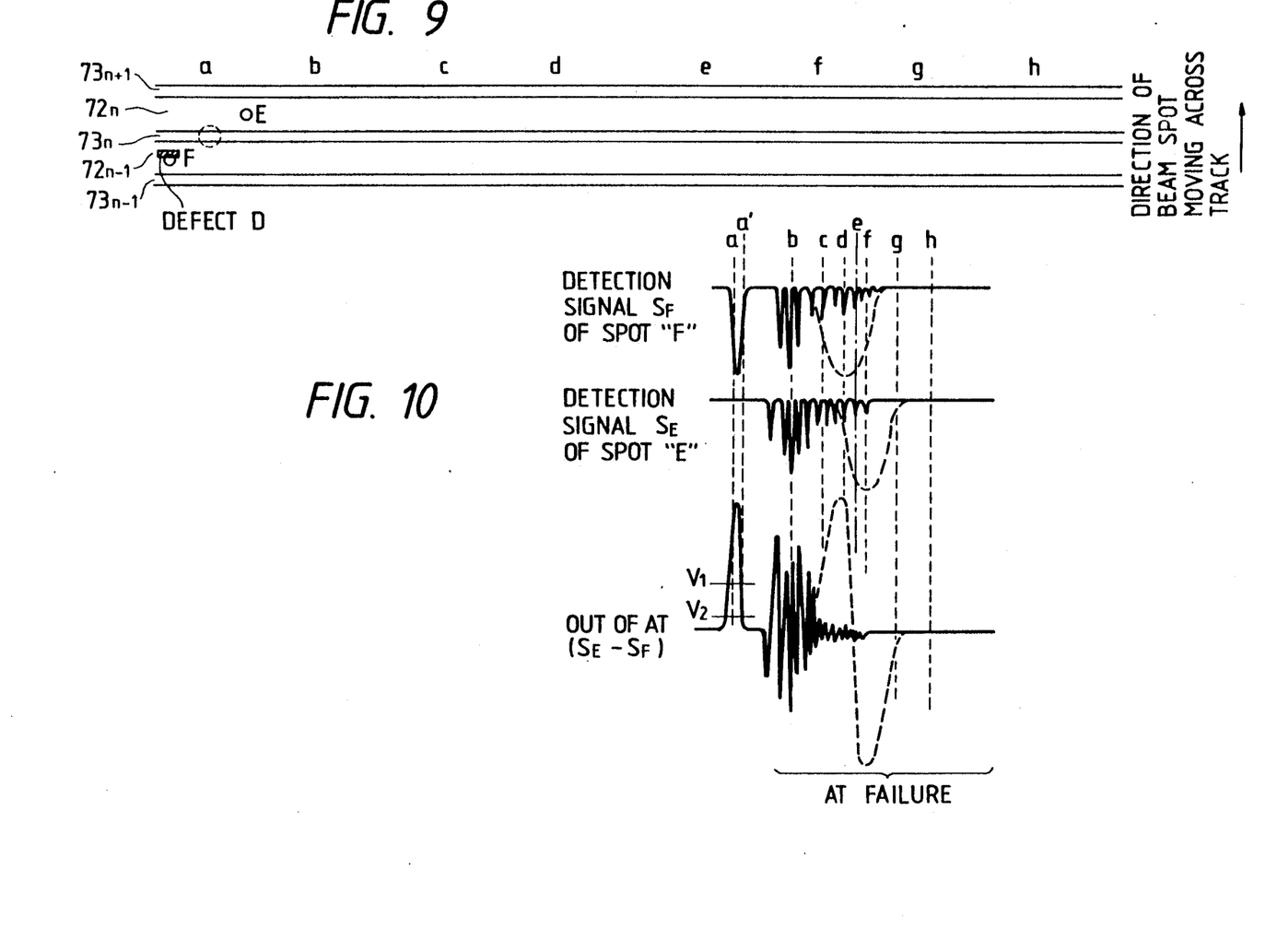
FIG. 9 is a schematic view showing the states of the tracks and the light spot in a case wherein there is a defect on a medium.
FIG. 10 is a waveform graph showing variations in the detection signals of the light spot and the AT error signal in a case wherein there is a defect on the medium.

However, in the above-described example of the prior art, if as in the example shown in FIG. 9 of the accompanying drawings, there is on the information recording carrier a defect D whose reflectivity is lower than or of the same degree as that of the tracking tracks, the AT error signal when the spot E or F crosses the defect D becomes greater than the predetermined value $V_1$ as shown in FIG. 10 of the accompanying drawings. The comparator 17 outputs an inversion signal to the AND gate 32. Therefore, the controller 15 tries to close the AT servo loop immediately after the state a'. Actually, however, the spots E and F are not entering the tracking track and therefore, as shown in FIG. 10, AT failure (out of AT) occurs. The influence of such a defect poses a problem not only when the tracking-ON state is entered from the tracking-OFF state at the start of the operation of the apparatus, but also when track jump is effected. The track jump refers to the operation of temporarily switching off the tracking from the state of tracking operation servo and moving the light spot to another track and again restoring the tracking-ON state.

SUMMARY OF THE INVENTION

It is the object of the present invention to solve the above-noted problems peculiar to the prior art and to provide an optical information processing method and apparatus in which malfunctioning attributable to a defect or the like on a medium does not occur when tracking servo is started.

The above object of the present invention is achieved by an optical information processing apparatus comprising:

means for scanning tracks formed on an optical recording medium by a light beam;

means for moving the applied position of said light beam in a direction across said tracks;

means for detecting a tracking error signal indicative of the deviation between the applied position of said light beam and said tracks;

tracking servo means for feeding said tracking error signal back to said moving means;

switching means for selectively rendering said tracking servo means operative or inoperative; and control means for measuring the time for which said tracking error signal exceeds a predetermined level, and switching said tracking servo means from its inoperative state to its operative state by said switching means after said time exceeds a predetermined time.

DESCRIPTION OF THE PREFERRED EMBODIMENTS

Figure 11:
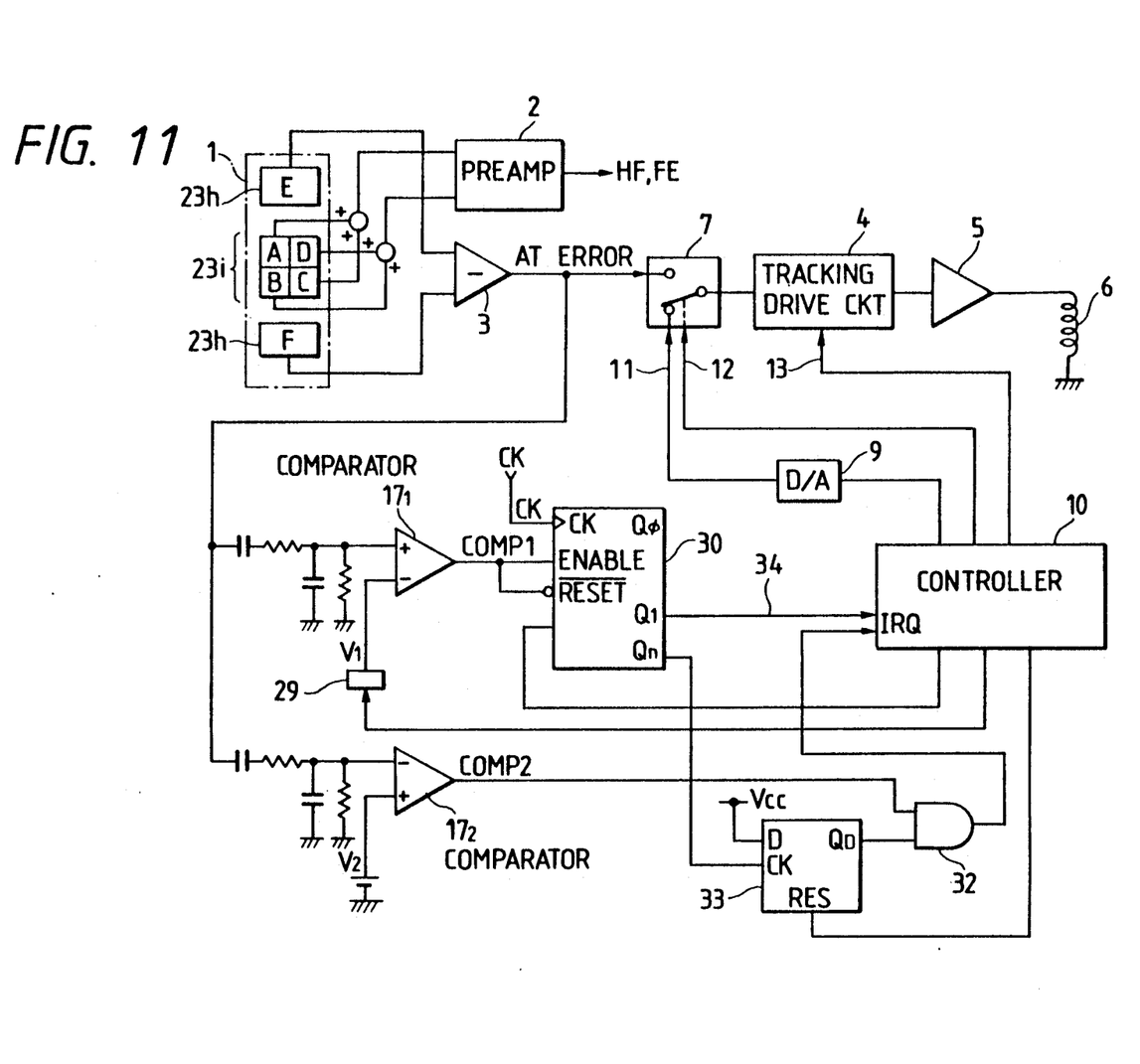
FIG. 11 is a block diagram showing an embodiment of an AT servo circuit used in the apparatus of the present invention.

FIG. 11 is a block diagram showing an embodiment of an AT servo circuit used in the optical information processing apparatus of the present invention. The apparatus of the present invention can be constructed just like the apparatus of FIG. 3, except for this AT servo circuit. In FIG. 11, members identical to those in FIG. 4 are given identical reference numerals and need not be described in detail.

A block diagram of a tracking control device according to a first embodiment of the present invention is shown in FIG. 11. Constituents which are functionally identical to those in the example of the prior art shown in FIG. 4 need not be described.

In FIG. 11, the reference numeral 7 designates a change-over switch for changing over an AT error signal and the output signal of a D/A converter 9 by a control signal 12 from a servo controller 10, the reference numeral $17_1$ denotes a comparator for comparing whether the AT error signal output which is the output of a tracking error amplifier 3 is greater than $V_1$, the reference numeral $17_2$ designates a comparator for comparing whether the AT error signal output is smaller than a predetermined voltage $V_2$, the reference numeral 29 denotes a presettable voltage varying device capable of being preset by the controller 10 which sets the value $V_1$, the reference numeral 9 designates a D/A converter which outputs an arbitrary voltage 11 to the change-over switch in response to a command from the controller 10, and the reference numeral 13 denotes a control signal output from the controller 10. The reference numeral 30 designates a presettable counter. The output of the comparator 17 is input to the Enable terminal and Reset terminal of the presettable counter 30. The reference numeral 33 denotes a D flip-flop, and the Qn terminal is connected to the CK terminal thereof. For the output signal of the Qn terminal to assume a high level, it is necessary that a signal be input to the presettable counter 30 for a time expressed by CK (one clock time)$\times n=T$, and the time T is chosen so as to be sufficiently longer than a time $t_1$ for which the AT error signal exceeds $V_1$ due to a defect D or the like on the information recording carrier and to be shorter than the time for which the AT error signal exceeds $V_1$ when a light spot crosses tracking tracks.

Figure 12:
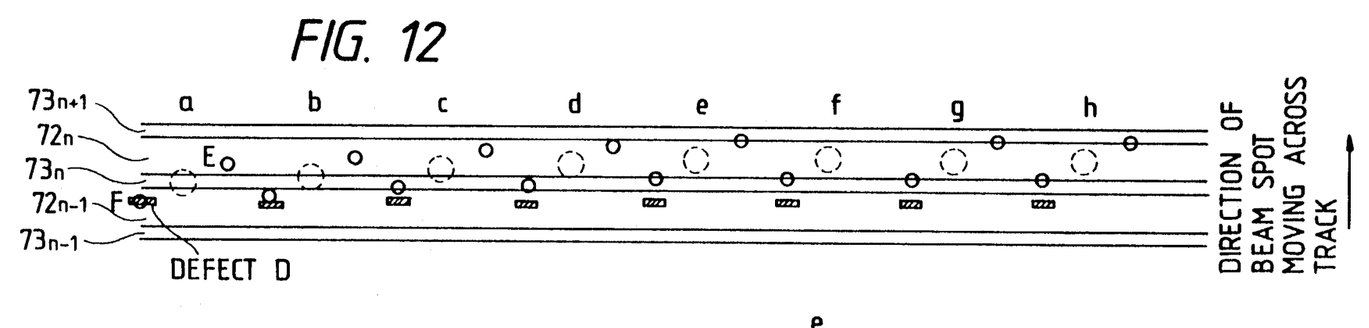
FIG. 12 is a schematic view showing the states of tracks and a light spot when the pull-in of tracking servo is effected by the use of the circuit shown in FIG. 11.
Figure 13:
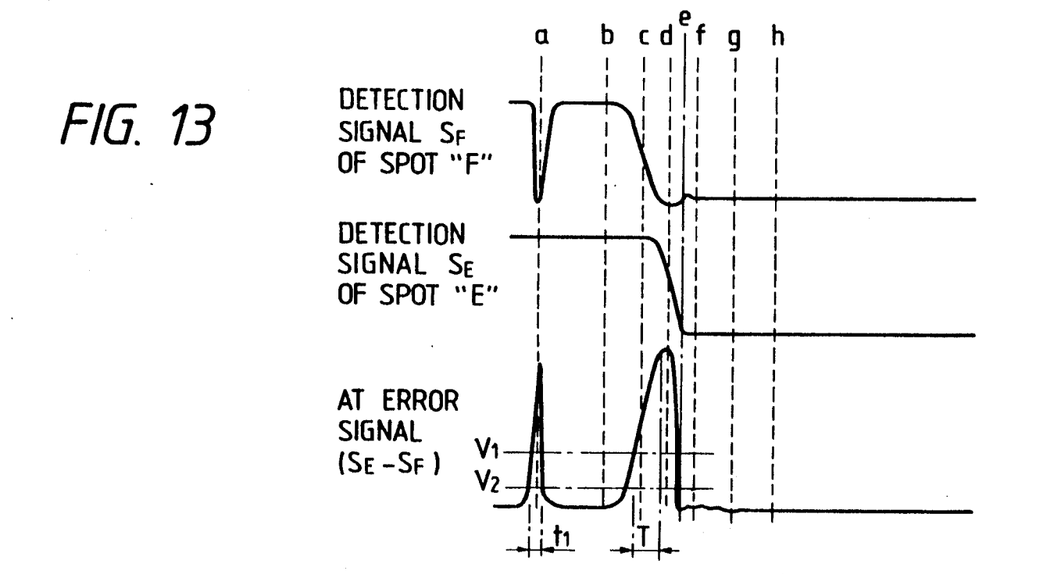
FIG. 13 is a waveform graph showing variations in the detection signals of the light spot and the AT error signal corresponding to FIG. 12.
Figure 14:
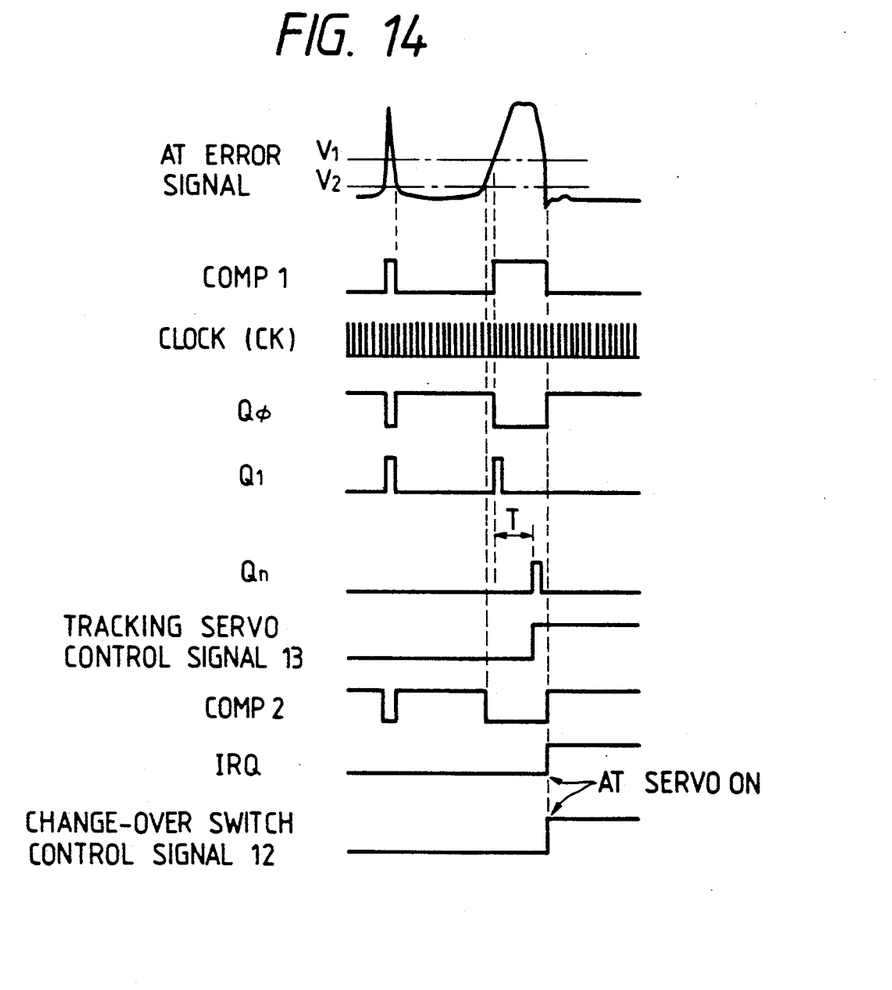
FIG. 14 shows the signal waveforms of various portions in the circuit shown in FIG. 11.
Figure 15:
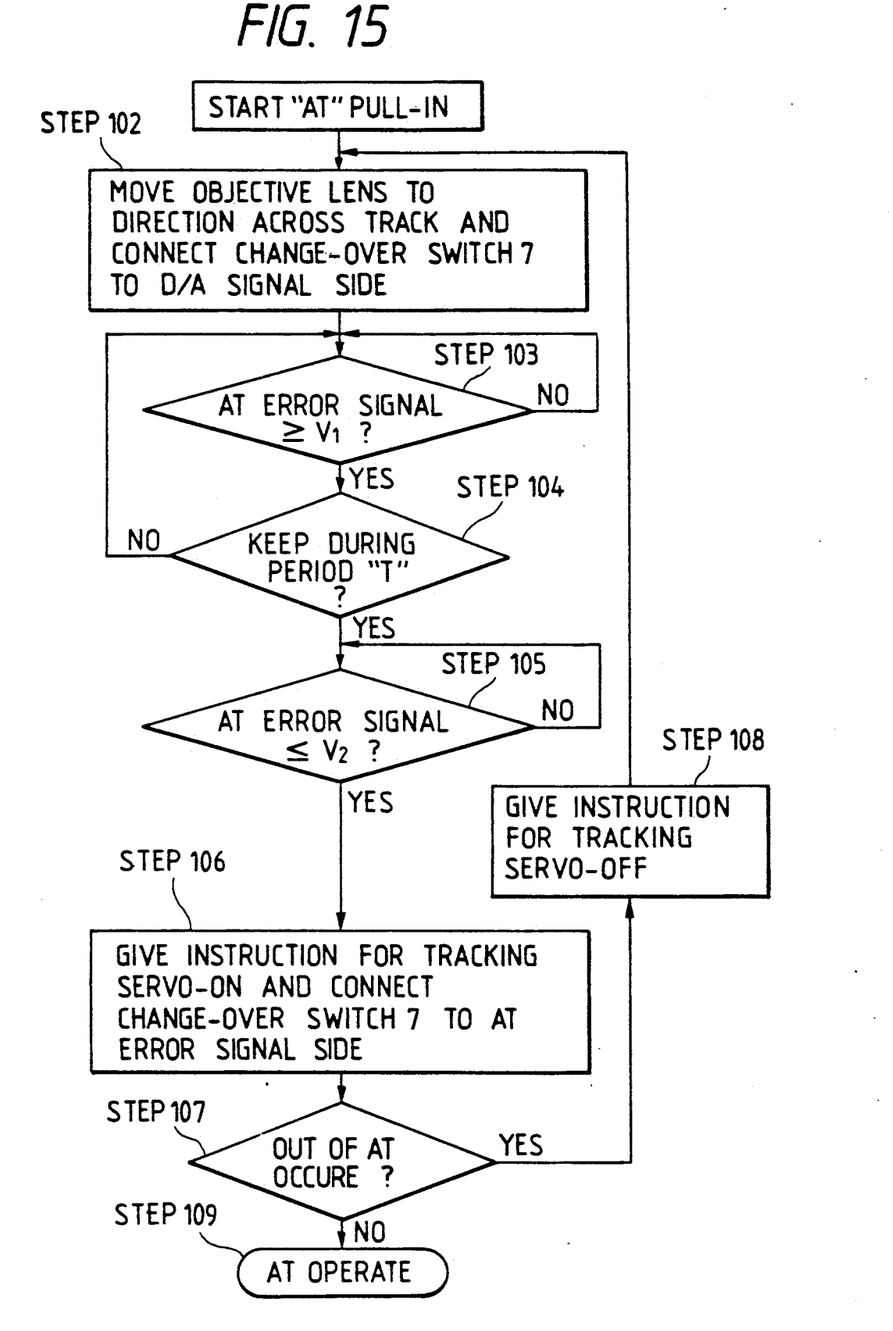
FIG. 15 is a flow chart showing the pull-in process of tracking servo using the circuit shown in FIG. 11.

Description will now be made of the process in which, in the above-described construction, a shift is made from the tracking OFF state to the ON state near the location at which the defect D exists, as shown in FIG. 12. FIG. 13 is a waveform graph showing variations in the reproduction signals $S_E$ and $S_F$ of beam spots corresponding to the states a-h in FIG. 12 and the AT error signal, and FIG. 14 shows the signal waveforms of various portions of the circuit shown in FIG. 11. FIG. 15 is a flow chart illustrating such an AT pull-in process.

At first, the change-over switch 7 is connected to the D/A converter 9 side, and the triangular wave output of the D/A converter 9 flows to a tracking actuator 6, whereby an objective lens begins to move across the tracks (the step 102 of FIG. 15). In the state a in FIG. 12, the light beam spot F is applied to the defect D and therefore, the AT error signal, as shown in FIG. 13, is input to the comparator $17_1$ as a voltage component higher than $V_1$. (At step 103 of FIG. 15, advance is made to YES.) The output of the comparator $17_1$ then assumes a high level and the presettable counter 30 starts to count the clock CK (step 104). When a time $t_1$ elapses, the beam spot F passes the defect D as shown at b in FIG. 12, and the AT error signal becomes smaller than $V_1$. The output of the comparator $17_1$ then assumes a low level and the presettable counter 30 is reset. In the meantime, $t_1 << T$ and therefore, the signal output from the Qn terminal of the counter 30 is at a low level. Accordingly, the output of an AND gate 32 also is at a low level, and the controller 10 still continues to move the light spot across the tracks. (At the step 104 of FIG. 15, advance is made to NO.)

Next, in the state c, the spot F reaches the tracking track and therefore, the AT error signal level increases and exceeds the $V_1$ level. Then the output of the comparator $17_1$ assumes a high level, and the counter 30 starts to count the clock CK. When the spot is crossing the tracking track at this time, the AT error signal is greater than $V_1$ for a period longer than $CK \times n = T$ and therefore, the Qn output of the counter 30 assumes a high level. The $Q_D$ output of the D flip-flop 33 also assumes a high level. (At step 104, advance is made to YES.) When the AT error signal becomes smaller than $V_2$, the output Comp 2 of the comparator $17_2$ assumes a high level. (At step 105, advance is made to YES.) The output of the AND gate 32 assumes a high level and an interruption signal is output to the terminal IRQ of the controller 10. The controller 10 immediately outputs a control signal 12 and connects the change-over switch 7 to the AT error signal side, and effects the change-over to the tracking servo-ON state (the step 106 of FIG. 15).

Further, the controller 10 confirms whether AT failure (out of AT) occurs (step 107), and if AT failure does not occur, the AT operation is continued as shown at e-f in FIG. 12 (the step 109 of FIG. 15). If AT failure occurs, the tracking servo is rendered into the OFF state (step 108), and return is made to the step 102, where AT pull-in is started again.

At a point of time when the output of the Qn terminal of the counter 30 has assumed a high level, the controller 10 receives this output 34 and outputs a control signal 13 to the tracking drive circuit 4, thereby switching the gain or the like of the circuit 4 in advance.

According to the present invention, as described above, even if a detect exists on the medium when a shift is made from the tracking-OFF state to the tracking-ON state, no malfunctioning occurs and the shift can be accomplished stably.

Figure 16:
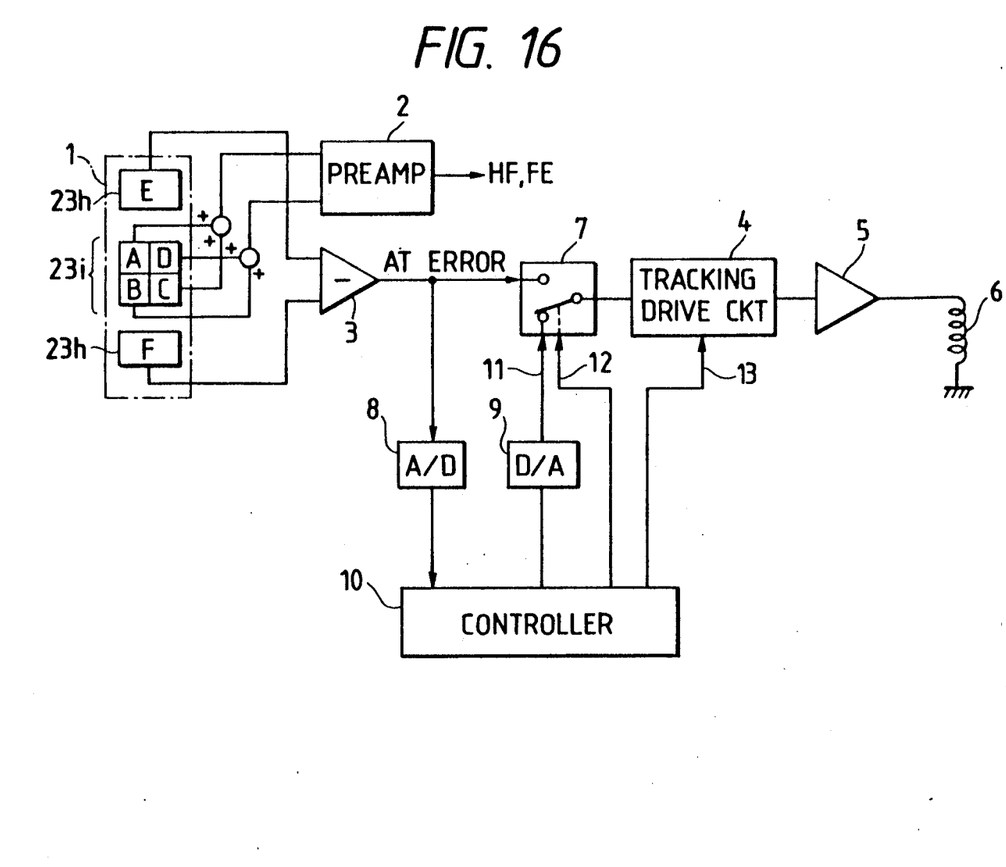
FIGS. 16 and 17 are block diagrams showing other embodiments of the AT servo circuit used in the apparatus of the present invention.
Figure 17:
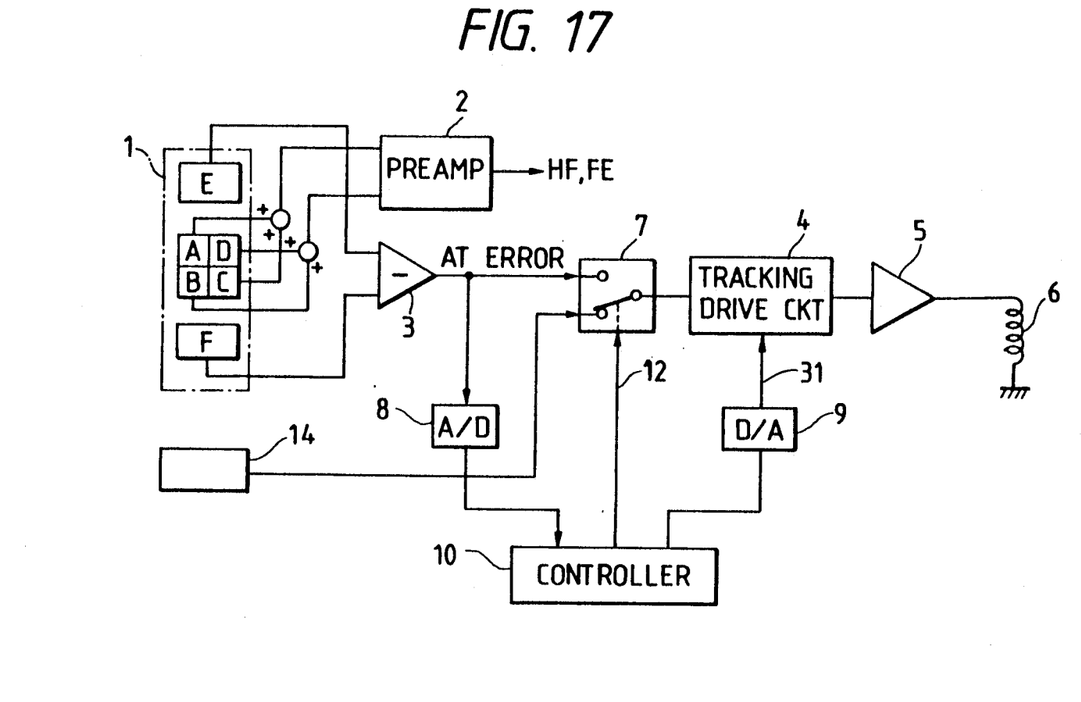

FIGS. 16 and 17 are block diagrams showing other embodiments of the AT servo circuit used in the optical information processing apparatus of the present invention. In these figures, members identical to those in FIG. 11 are given identical reference numerals and need not be described in detail.

In the embodiment shown in FIG. 16, the AT error signal is input to the controller 10 through the A/D converter 8, and the discrimination of the level of the AT error signal and the measurement of the time for which the AT error signal is above a predetermined level are effected by a central processing unit (CPU) in the controller 10 by the use of software In the other points, the construction of this embodiment is similar to the construction of the first embodiment shown in FIG. 11.

The present embodiment has the effect that although as compared with the first embodiment, the burden of software increases, the discrete parts such as the comparators 17₁ and 17₂ and the counter 30 become unnecessary and the cost of the apparatus is reduced.

In the embodiment shown in FIG. 17, the reference numeral 8 designates an A/D converter for inputting the AT error signal to the controller 10. The reference numeral 14 denotes a sensor for detecting the relative position between the objective lens and the optical head in the direction across the tracks, and this sensor 14 is connected to one contact of the change-over switch 7. The reference numeral 9 designates a D/A converter which connects the controller 10 and the reference of the tracking servo circuit 4.

In the present embodiment, as in the embodiment shown in FIG. 16, the discrimination of the level of the AT error signal and the measurement of the time for which the AT error signal is above a predetermined level are effected by a CPU in the controller 10 by the use of software.

Also, when in the tracking-OFF state, the objective lens is to be moved across the tracks, the D/A output 31 input to the tracking drive circuit 4 is converted, for example, into a triangular wave, and the change-over switch 7 is connected to the position sensor 14 side and the objective lens is moved across the tracks in the closed loop by the sensor output of the position sensor 14.

Thereby, as compared with the first embodiment, higher accuracy can be obtained when the objective lens is moved.

The present invention permits various applications besides the above-described embodiments. For example, the present invention is not restricted to an apparatus using the aforedescribed optical card, but is also applicable to an apparatus using a disk-like or tape-like medium. Also, when the medium is of a transmission type, design may be made such that the light transmitted through such a medium is received by a photodetector to thereby detect the tracking error signal. Further, the present invention is also applicable to an apparatus using a magneto-optical recording medium as the medium.

The present invention covers all such applications without departing from the scope of the invention as defined in the appended claims.

What is claimed is:

1. An optical information processing apparatus comprising:
   means for scanning tracks formed on an optical recording medium by a light beam;
   moving for moving the applied position of said light beam in a direction across said tracks;
   means for detecting a tracking error signal indicative of the deviation between the applied position of said light beam and said tracks;
   tracking servo means for feeding said tracking error signal back to said moving means;
   switching means for selectively rendering said tracking servo means operative or inoperative; and
   control means for measuring the time for which said tracking error signal exceeds a predetermined level, and for switching said tracking servo means from its inoperative state to its operative state by said switching means after said time exceeds a predetermined time.

2. An optical information processing apparatus according to claim 1, wherein said control means effects switching when the tracking error signal decreases to near the zero level after the time for which said tracking error signal exceeds a predetermined level exceeds the predetermined time.

3. An optical information processing apparatus according to claim 1, wherein said control means comprises comparing means for comparing said tracking error signal with said predetermined level, and time counting means for starting and stopping time counting in conformity with the output of said comparing means.

4. An optical information processing apparatus according to claim 1, further comprising means for causing a drive signal to be input to said moving means when said tracking servo means is inoperative.

5. An optical information processing apparatus comprising:
   a light source for emitting a light beam;
   an optical system for converging the light beam emitted from said light source on an optical recording medium having tracks to form a light spot;
   a motor for moving said light spot and said optical recording medium relative to each other along said tracks;
   an actuator for moving said light spot in a direction across the tracks;
   a detecting circuit for detecting a tracking error signal indicative of the positional relation between said light spot and said tracks;
   a tracking servo circuit for feeding back said tracking error signal back to said actuator;
   a switching circuit for selectively rendering said tracking servo circuit operative or inoperative;
   a control circuit for measuring the time for which said tracking error signal exceeds a predetermined level, and for switching said tracking servo circuit from its inoperative state to its operative state by said switching circuit after said time exceeds a predetermined time.

6. An optical information processing apparatus according to claim 5, wherein said control circuit effects switching when the tracking error signal decreases to near the zero level after the time for which said tracking error signal exceeds a predetermined level exceeds the predetermined time.

7. An optical information processing apparatus according to claim 5, wherein said control circuit comprises a comparator for comparing said tracking error signal with said predetermined level, and a counter adapted to be set and reset in conformity with the output of said comparator.

8. An optical information processing apparatus according to claim 7, wherein said control circuit further comprises a second comparator for comparing said tracking error signal with a second level approximately to zero.

9. An optical information processing apparatus according to claim 8, wherein said control circuit further comprises a flip-flop for holding the high level output of said counter, and an AND gate for outputting the logic product signal of the output of said flip-flop and the output of said second comparator.

10. An optical information processing apparatus according to claim 5, further comprising a drive signal source for inputting a drive signal to said actuator during non-operation of said tracking servo circuit.

11. In an apparatus provided with means for detecting a tracking error signal and in which tracks formed on an optical recording medium are scanned by a light beam while tracking servo is effected on the basis of the signal, thereby recording and/or reproducing information, a method of switching the tracking servo from its inoperative state to its operative state comprising the steps of:

moving the applied position of the light beam in a direction across the tracks;

judging whether the tracking error signal exceeds a predetermined level;

measuring the time for which the tracking error signal exceeds the predetermined level;

judging whether the measured time has exceeded a predetermined time; and rendering the tracking servo operative when the tracking error signal decreases to near the zero level after the measured time has exceeded the predetermined time.

* * * * *

UNITED STATES PATENT AND TRADEMARK OFFICE
CERTIFICATE OF CORRECTION

PATENT NO. : 5,077,718

DATED : December 31, 1991

INVENTOR(S) : Machiko Matsushita

It is certified that error appears in the above-identified patent and that said Letters Patent is hereby corrected as shown below:

ON THE COVER PAGE

IN THE ABSTRACT

Line 9, "means," should read --device,--.

IN THE DRAWINGS

FIGURE 15

In step 107, "OCCURE" should read --OCCURS--.

COLUMN 2

Line 25, "is 23i and" should read --23i and is--.

COLUMN 3

Line 44, "this" should read --the--;
Line 45, "the" should read --this--;
Line 64, "OV" should read --0V--; and
Line 67, "from and" should read --from--.

UNITED STATES PATENT AND TRADEMARK OFFICE
CERTIFICATE OF CORRECTION

PATENT NO. : 5,077,718
DATED : December 31, 1991
INVENTOR(S) : Machiko Matsushita It is certified that error appears in the above-identified patent and that said Letters Patent is hereby corrected as shown below:

COLUMN 7

Line 7, "detect" should read --defect--; and
    Line 23, "software In" should read
--software. In--.

COLUMN 8

Line 11, "moving for" should read --moving means for--;
    Line 56, "back" should be deleted; and
    Line 59, "inoperative" should read
--inoperative; and--.

COLUMN 9

Line 14, "to" should be deleted.

Signed and Sealed this

Eleventh Day of May, 1993

Attest:

MICHAEL K. KIRK

Attesting Officer    Acting Commissioner of Patents and Trademarks